United States Patent [19]

Jordan

[11] 4,348,785
[45] Sep. 14, 1982

[54] WHEEL ASSEMBLY

[76] Inventor: Gerald J. Jordan, P.O. Box 93, Marceline, Mo. 64658

[21] Appl. No.: 264,383

[22] Filed: May 18, 1981

Related U.S. Application Data

[63] Continuation-in-part of Ser. No. 185,108, Sep. 8, 1980, Pat. No. 4,322,869.

[51] Int. Cl.³ .............................................. A47B 91/00
[52] U.S. Cl. ..................................................... 16/046
[58] Field of Search ................................ 16/46, 47, 18

[56] References Cited

U.S. PATENT DOCUMENTS 3,194,293 7/1965 Kindley ................................... 16/45
4,295,256 10/1981 Pascal ..................................... 16/45

Primary Examiner—Doris L. Troutman
Attorney, Agent, or Firm—Kokjer, Kircher, Bradley, Wharton, Bowman & Johnson

[57] ABSTRACT

A wheel assembly including an annular rim with an outer bearing race formed on the inner periphery thereof. Cylindrical rollers are in rolling engagement with the outer bearing race and with an inner bearing race formed on a central sleevelike shaft which telescopes onto a support axle. The rollers are rotatably supported on axles which are rotatably supported on and extend between a pair of retainers. These retainers are freely rotatable relative to the rim and central shaft. The rim has one end cap fixed thereto for closing one end of the roller region, and a removable end cap is seated on the rim adjacent the other end of this region. The retainers have ramp cams between the axle-receiving grooves to facilitate installing and positioning of the axles on the retainers. Each roller includes two cylindrical portions integrally joined together but separated by an annular groove, and the central shaft has an annular ridge projecting outwardly therefrom and snugly but slidably accommodated within the grooves on the rollers for permitting transfer of axial forces therebetween.

10 Claims, 7 Drawing Figures

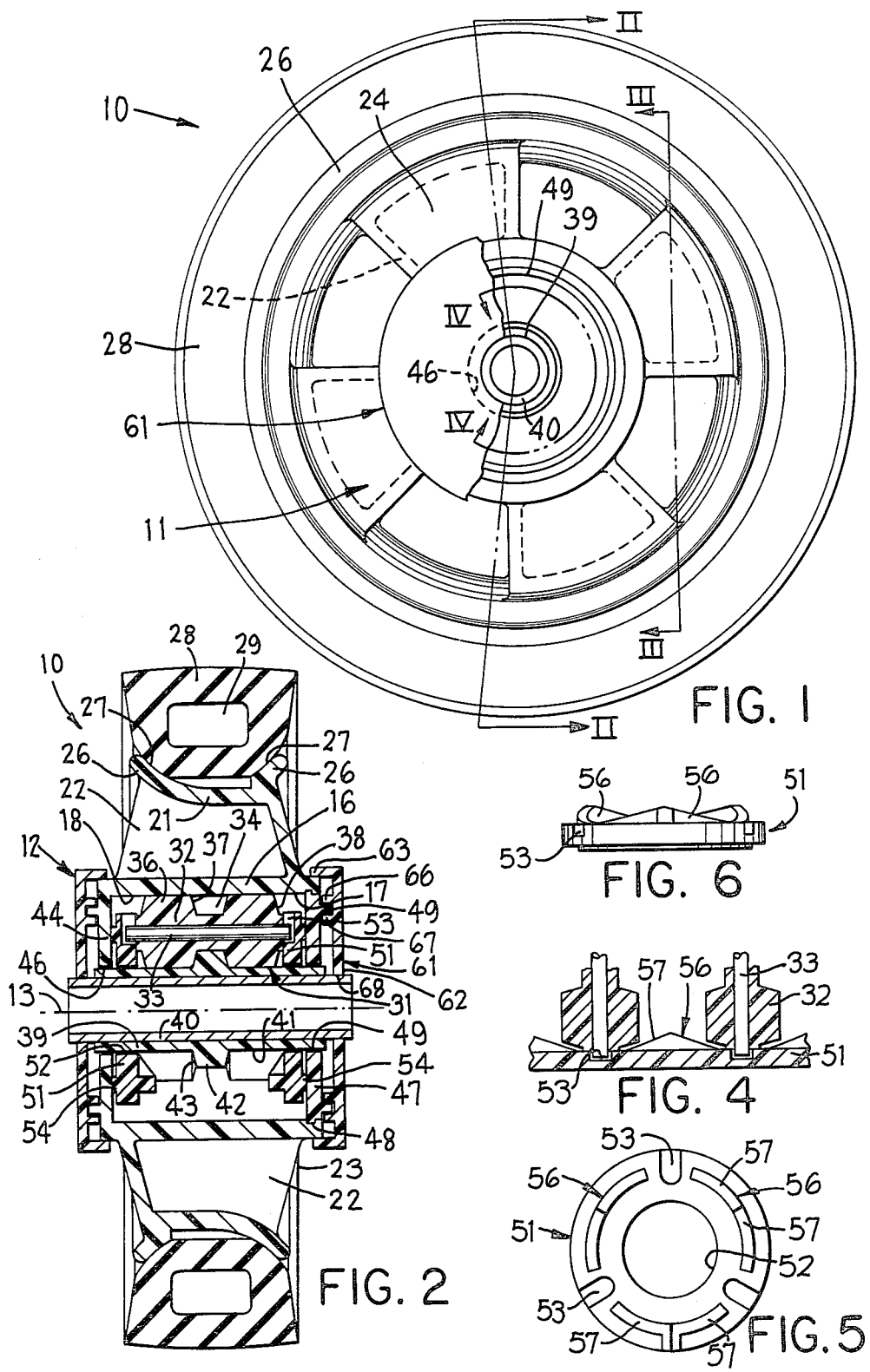

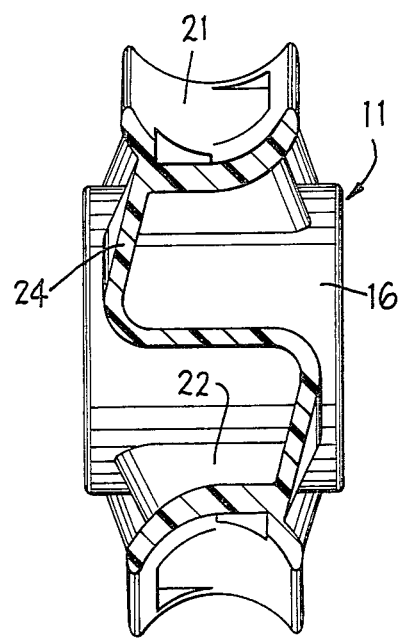
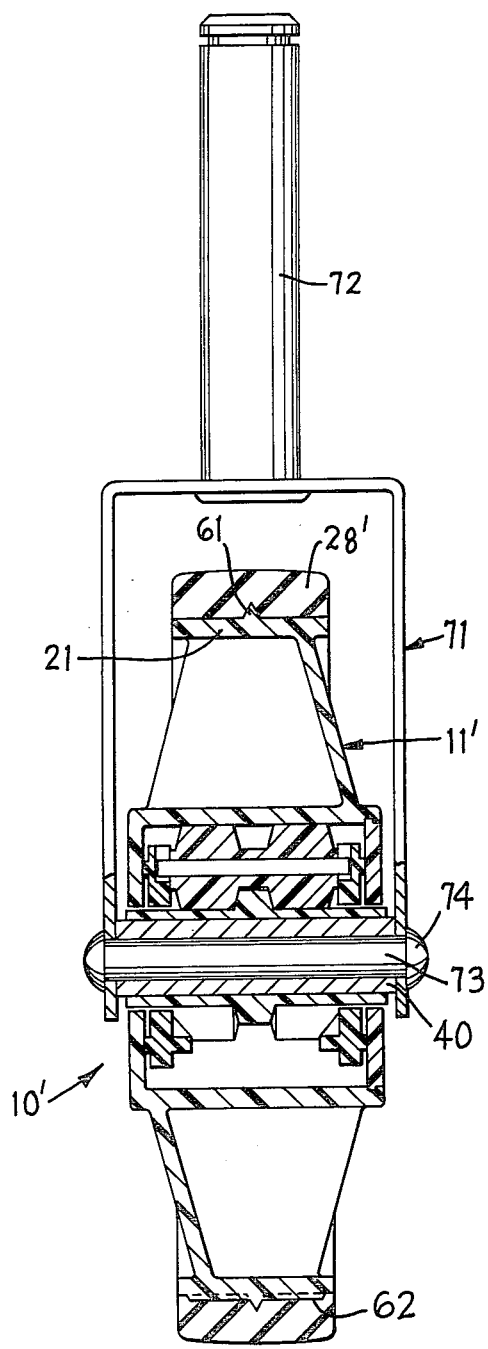
FIG. 3
FIG. 7

WHEEL ASSEMBLY

CROSS REFERENCE TO RELATED APPLICATION

This is a continuation-in-part of my copending application Ser. No. 185,108 filed Sept. 8, 1980, now U.S. Pat. No. 4,322,869.

FIELD OF THE INVENTION

This invention relates to an improved wheel assembly which provides for improved rotation of the wheel assembly relative to a nonrotatable support axle such that minimal friction, and hence minimal driving energy, is involved.

BACKGROUND OF THE INVENTION

Numerous wheel assemblies have been devised employing various types of anti-friction rolling elements, including planetary systems, for permitting the wheel to be rotatably supported on or relative to an axle. While such wheel assemblies have normally performed in a manner which has been considered satisfactory, nevertheless there has been a long term and continuous effort to improve on such wheel assemblies so as to make them more free-wheeling, as by minimizing the internal friction of the wheel assembly, while at the same time maintaining or improving the durability of the wheel assembly. This problem of providing a wheel assembly which is substantially free-wheeling, that is possesses minimum friction, and at the same time possesses desirable wear and durability characteristics, has been further compounded by the additional difficulties created due to the use of many wheels under contaminating environmental conditions (such as snow, water, liquids, dust and the like) which tend to contaminate the bearings, thereby greatly increasing both wear and rolling friction.

My copending application Ser. No. 185,108 filed Sept. 8, 1980, the disclosure of which is incorporated herein by reference, discloses a wheel assembly which provides significant improvement in the rotational characteristics by minimizing the rolling friction within the wheel assembly, while at the same time resulting in a wheel assembly having desirable durability, which improvements are achieved by providing the wheel assembly with an increased number of rotational freedoms so that the wheel more closely approaches a freely rotating system. While my aforesaid wheel assembly does provide for significantly improved rotational freedom, nevertheless I have continued to study, develop and improve upon this wheel assembly so as to still further improve the free rotational characteristics thereof, while at the same time increasing the durability of the wheel assembly while minimizing the complexities relative to manufacture and assembly.

Thus, this invention relates to still further improvements in a wheel assembly, which further improvements are believed to result in a wheel assembly which even further minimizes rolling friction so that the wheel more closely approaches a free-wheeling system, and at the same time possesses substantially increased durability and resistance to wear. This improved wheel assembly also possesses characteristics which are believed to enable it to operate in a highly satisfactory and desirable manner over long periods of time under conditions where the wheel assembly is exposed to numerous contaminants, such as water, snow, dirt, ice and other corrosives, such as when the wheel assembly is utilized on supermarket shopping carts. At the same time, this improved wheel assembly possesses structural and functional characteristics which not only simplify manufacture of the individual components, but also simplify the assembly of these components into the completed wheel arrangement.

In the improved wheel assembly of this invention, the wheel includes an annular rim having an outer bearing race formed directly on the inner periphery thereof. A minimal number of substantially cylindrical rollers are positioned within the rim so as to be in rolling engagement with the outer bearing race, which rollers in turn are rollingly engaged with an inner bearing race formed on a central sleevelike support shaft, which latter shaft is adapted to be telescoped onto an appropriate support axle. The cylindrical rollers are themselves individually rotatably supported on suitable axles, which axles in turn are rotatably supported on and extend between a pair of retainer rings. The retainer rings are freely rotatable relative to both the rim and the support shaft. The rim has one end cap integrally fixed thereto for closing one end of the annular region wherein the rollers are confined, and a removable end cap is fixedly seated on the rim adjacent the other axial side thereof for closing the other end of this annular region. The retainers have narrow annular ribs on the outer axial faces thereof which rotatably slidably bear against the inner faces of the end caps. The retainers, on their inner axial faces, have peripherally extending ramp cams disposed between the axle-receiving grooves to facilitate installing and proper positioning of the axles on and between the retainers. Each roller includes two cylindrical portions integrally joined together and spaced axially apart by an intermediate annular groove which is defined between opposed sidewalls which are preferably tapered or sloped, and the central support shaft has a similarly shaped annular ridge projecting outwardly therefrom and snugly but slidably accommodated within the grooves defined by the rollers for providing effective internal transfer of axial thrust forces therebetween.

In a preferred embodiment of the wheel assembly according to this invention, the rim is formed with a shallow outwardly opening channel therein, whereupon a semi-pneumatic tire can be positioned and retained therein.

Other objects and purposes of the invention will be apparent to persons familiar with wheel assemblies upon reading the following specification and inspecting the accompanying drawings.

BRIEF DESCRIPTION OF THE DRAWINGS

FIG. 1 is a side elevational view of a preferred embodiment of a wheel assembly according to the present invention.

FIG. 2 is a central sectional view taken substantially along line II—II in FIG. 1.

FIG. 3 is an end elevational view of solely the rim, same being partially in cross section as taken substantially along line III—III in FIG. 1.

FIG. 4 is a fragmentary sectional view taken substantially along line IV—IV in FIG. 1.

FIG. 5 is an elevational view illustrating solely the inner side of the retainer.

FIG. 6 is a bottom view of the retainer illustrated in FIG. 5.

FIG. 7 is a central sectional view similar to FIG. 2 but illustrating a variation of the invention, and also illustrating the manner in which the embodiment of either FIG. 2 or FIG. 7 can be associated with a yoke of the type utilized for mounting the wheel assembly on an apparatus, such as a shopping cart.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the wheel assembly and designated parts thereof. Said terminology will include the words specifically mentioned, derivatives thereof, and words of similar import.

DETAILED DESCRIPTION

Referring to FIGS. 1-6, there is illustrated a preferred embodiment of a wheel assembly 10 according to this invention, which wheel assembly has exhibited extremely low friction and hence possesses substantially free-wheeling characteristics. This wheel assembly 10 includes an annular rim 11 disposed in surrounding relationship to a bearing means 12, the latter in turn being engagable with a central support axle which defines the rotational axis 13 for the wheel assembly.

The annular rim 11 includes an inner annular hub 16 which defines therein a substantially cylindrical central opening 17. The inner periphery of hub 16 defines a radially inwardly directly bearing surface 18 which functions as the outer race of the bearing means 12.

Rim 11 also includes an outer annular hub or rim portion 21 which is concentric with the inner hub 16 and is rigidly joined thereto by a plurality of spokes 22 which are equally angularly spaced about the rim and extend radially thereof. These spokes 22 have an axial width which closely approximates the overall axial width of the rim 11 and, as illustrated in FIG. 2, the spokes are provided with side edges 23 which are sloped or tapered inwardly as they project radially outwardly. The spokes thus have an axial width at their radially outer ends which is shorter and more closely corresponds in size to the axial dimension of the outer hub 21, whereas the spokes 22 at their radially inner ends are of greater axial length and correspond more closely to the axial length of the inner hub 16, which hub projects axially outwardly beyond the respective axial edges of the outer hub 21. The radially adjacent spokes 22 are joined together by peripherally extending sidewalls 24, the latter being alternately located adjacent the opposite axial sides of the rim so as to cooperate with the spokes 22 and thereby form a continuous and non-perforated wall extending radially between the inner and outer hubs 16 and 21, respectively.

The outer hub 21, when viewed in axial cross section as illustrated in FIG. 2, is of a shallow channel-shaped configuration which opens radially outwardly. To provide this configuration, the outer hub 21 has opposite annular edge portions 26, each of which slopes radially and axially outwardly relative to the rim. These edge portions 26 thus define thereon inner annular support surfaces 27 which extend at an angle of approximately 45° relative to a radial plane perpendicular to the rotational axis, such that the two support surfaces 27 define therebetween an included angle in the neighborhood of 90°.

The shallow channel-shaped configuration of outer hub 21 permits the rim 11 to mount thereon an annular semi-pneumatic tire 28, which tire 28 has the inner portion thereof suitably rounded so as to enable it to be initially radially expanded a sufficient extent as to pass over the edge portions 26, following which the central annular chamber 29 of the tire is inflated so that the inner portion of the tire expands so as to snugly and securely seat within the outer hub 21 substantially as illustrated by FIG. 2. The rim 11 is preferably formed as an integral one-piece structure, such as by being molded, and is also preferably formed from a hard, low-friction plastic material, such as Delrin (Trademark).

Considering now the bearing means 12, same includes a plurality of substantially cylindrical roller units 31 disposed angularly about the rotational axis 13 at uniformly spaced intervals. The illustrated embodiment possesses three such roller units 31, and each employs a one-piece cylindrical roller 32 which is rotatably supported on an elongated shaft or axle 33. The roller 32 has a central annular groove 34 formed therearound so that the roller thus includes a pair of identical cylindrical roller portions 36 disposed in axially spaced relationship, which cylindrical roller portions are disposed in rolling engagement with the outer bearing race 18. The central annular groove 34 is of a tapered configuration so that the opposite sides thereof are defined by opposed conical annular surfaces 37 as defined on the opposed inner ends of the roller portions 36. The roller portions 36 also have conical annular surfaces 38 formed on the outer ends thereof, which surfaces 38 are substantially identical to the surface 37 but slope in the reverse direction. The one-piece roller 33, as described above, is thus of a "dumbbell" shape.

The rollers 33 externally surround and are rotatably engaged with an inner support sleeve or shaft 39 which is of an axial length substantially equal to or slightly greater than the axial length of the inner hub 16. This support shaft 39 is concentrically positioned within the hub 16 and its outer peripheral surface 41 is positioned so as to be in rolling engagement with the rollers 33, and more specifically in engagement with the peripheral surfaces of the roller portions 36. This support shaft 39 effectively defines the inner bearing race for the rollers 33. This inner bearing race also preferably includes a metal insert sleeve 40 concentrically press fit within the shaft 39. The opposite ends of insert sleeve 40 project axially slightly beyond the adjacent ends of the plastic support shaft 39.

Support shaft 39 also has an annular rib 42 fixedly, here integrally, joined thereto and projecting radially outwardly from the surface 41. This rib 42 is of a tapered configuration as it projects radially outwardly, and hence is defined between annular side surfaces 43 which are of a conical configuration and which slope axially inwardly toward one another as they project radially outwardly. The conical side surfaces 43 are sloped at the same angle as the roller end surfaces 37 so that the rib 42 projects into and substantially totally occupies the annular groove 34, substantially as illustrated in FIG. 2. This cooperation between rib 42 and grooves 34 prevents the rollers 33 from moving appreciably in the axial direction, whereupon the relative rotatable slidable engagement between the opposed conical surfaces 37 and 43 not only permits transference of side thrust (that is, axial) forces therebetween, but also permits transference of radially directed forces therebetween due to the conical relationship of these surfaces relative to the radial direction.

The annular region between the support shaft 39 and the inner hub 16, in which annular region the rollers 33 are confined, is suitably closed by appropriate end caps located adjacent the opposite axial ends of the hub 16. For this purpose, the hub 16 is preferably provided with a first annular end cap 44 formed integrally thereon, which end cap 44 projects radially inwardly and is provided with a central opening 46 sized so as to snugly yet rotatably accommodate therein one end of the support shaft 39. This opening 46 is only slightly oversized relative to the outer diameter of the shaft 39 to thereby provide a very narrow annular clearance gap therebetween, which thus minimizes friction but prevents any interference with the proper concentric bearing relationship of the rollers 33 between the surfaces 18 and 41. The other end of the annular region is closed by a further annular end cap 47, the latter being fixedly but removably connected to the annular hub 16. For this purpose, the hub 16 is provided with an annular undercut groove 48 formed therein, and the end cap 47 has its outer periphery accommodated within this groove. The end cap 47 is formed from a suitable plastics material, such as Delrin, so that it can be sufficiently resiliently deformed so as to resiliently snap into position within the groove. This end cap 47 also has a central opening 49 therethrough which is coaxially aligned with and sized identically to the aforesaid opening 46 so as to enable the other end of support shaft 39 to be rotatably accommodated therein. Each end cap 44 and 47 also has, adjacent its outer edge, a concentric annular flange 49 which projects axially outwardly. The purpose of flange 49 is explained hereinafter.

Each roller axle 33, the axis of which extends parallel with but is spaced radially outwardly from the rotational axis 13, extends axially between and is rotatably supported on a pair of identical annular retainers 51. These retainers 51 are positioned adjacent the opposite axial ends of the rollers 32 so that the latter are confined therebetween, and the retainers themselves are disposed adjacent the opposite axial ends of the central hub opening 17, so that the retainers are thus positioned directly adjacent the end caps 44 and 47.

Each retainer 51 comprises a platelike ring having a central opening 52 so as to loosely accommodate therein the inner support shaft 39. The retainer 51 has a maximum radial dimension which is substantially less than the diameter of the central opening 17 so that the retainer will easily fit within this opening without rubbing or bearing against the bounding peripheral wall thereof. The retainer 51 has a plurality, here three, of openings 53 formed therein, which openings project axially inwardly of the retainer from the axially inner side thereof. These openings 53, in the illustrated embodiment, comprise slots which project radially inwardly from the outer periphery of the retainer through a limited radial extent. These openings or slots 53 are equal in number to the number of roller axles 33 and are equally angularly spaced apart so that each slot 53 rotatably receives and confines therein the projecting end of the respective roller axle 33. Each slot 53 is sized, in the peripherally extending direction, so as to be only slightly larger than the diameter of the axle 33 so as to snugly peripherally confine the axle 33 yet permit free rotation of the axle relative to the retainer. The radial slots 53 do, however, permit radial floating displacement of the axles 33 so that the rollers 32 will be individually maintained in proper rolling engagement with the inner and outer bearing races, so as to provide for optimum bearing support.

Each retainer 51 also has an annular abutment flange 54 fixedly and integrally formed thereon, which flange 54 is concentric with the retainer and projects axially outwardly thereof so that the axially outer end of the abutment flange defines a substantially planar abutment or rubbing surface, the latter being disposed in relative rotatable sliding engagement with the inner planar surface formed on the respective end cap 44 or 47. To minimize the frictional contact between the retainer and its respective end cap, this annular abutment flange 54 is of thin radial dimension.

The retainer 51 also has a plurality, here three, of ramps 56 formed on and projecting axially inwardly from the inner sidewall thereof. These ramps 56 are individually disposed so as to extend circumferentially between each adjacent pair of slots 53, so that the ramps 56 are thus disposed within a substantially circular array which is concentric with the retainer. Each of these ramps 56, as illustrated in FIGS. 4–6, is of a substantially triangular configuration which defines a peak or apex at the midpoint thereof, so that the ramp hence defines sloped or cam surfaces 57 which slope downwardly in opposite peripheral directions away from the apex, with the outer lowermost ends of these sloped surfaces terminating directly adjacent the respective slot 53. Since the diameter of this circular array of ramps 56 substantially corresponds to the diameter of the circular locus defined by the plurality of roller axles 33, these ramps 56 are thus positioned such that the exposed ends of the axles 33 will engage the cam surfaces 57 during initial installation of the roller units so that the roller units can thus be easily circumferentially cammed so as to cause the projecting ends of the axles 33 to properly register with the slots 53.

The retainer 51 is preferably formed in one piece, as by being molded of a hard low-friction plastic material, such as Delrin. The bearing rollers 32 are also preferably formed from a hard low-friction plastic material, such as Delrin.

To effectively enclose the bearing means 12 and prevent entry of dust and other contaminants, there is provided a pair of identical stationary dust shields 61 which effectively enclose the opposite axial ends of the inner hub 16. Each dust shield 61 is of a shallow cup-shaped configuration and has a central opening 68 so that the shield snugly and fixedly seats on the exposed end of the insert shaft 40. The shield is preferably formed of a plastics material.

As illustrated by FIG. 2, each dust shield 61 includes an enlarged annular base plate 62 having an annular peripheral flange 63 which projects axially thereof, which flange 63 closely surrounds and overlaps the adjacent axial end of the inner hub 16 whereby only an extremely small clearance gap is provided therebetween. The shield 61 also includes a pair of radially spaced, concentric annular flanges 66 and 67 which project axially inwardly from the base wall 62 and define an annular channel therebetween into which projects the annular flange 49 formed on the respective end cap. This flange 49 on the rotating end cap is hence rotatably received within the channel defined by the dust shield flanges 66–67 so that only very narrow clearance spaces exist therebetween. Hence, in order for contaminants to enter into the bearing, the contaminants must first pass through the narrow clearance between the inner hub 16 and the outer peripheral flange 63, and then must pass through the narrow clearance spaces provided between flanges 66-67 and the opposed sides of the flange 49, which clearance spaces require the contaminants to undergo a reversal in direction of 180°. This labyrinth arrangement created by flange 49 and flanges 66-67 hence effectively prevents contaminants from entering the bearing means 12.

In the wheel assembly 10, the number of roller units 31 provided in the bearing is preferably selected as an odd number, such as three, five or seven, with the number of roller units being maintained at a minimum consistent with the expected load requirements of the wheel assembly.

The wheel assembly is particularly desirable for use in situations where the wheel must possess substantial durability coupled with minimal rolling or rotational friction, and particularly in those situations where contamination of the bearing has been a continuing problem. For example, the improved wheel assembly is believed particularly desirable for use as a wheel on a shopping cart.

FIG. 7 illustrates a typical mounting for the wheel assembly 10 when the latter is used as a support roller for a shopping cart or the like. Under such usage, the wheel assembly 10 is supported within a substantially U-shaped yoke 71, which yoke has the opposite substantially planar legs thereof disposed in abutting engagement with the opposite ends of the support axle 40. A securing shaft 73 extends through the axle 40 and also through openings formed in the legs of the yoke, and the outer ends of this securing shaft 73 are suitably beaded or deformed to define enlarged heads 74 which thereby axially and fixedly secure the yoke relative to the insert 40. The yoke, in such usage, also has a conventional mounting arrangement, such as a stub shaft 72, projecting therefrom to facilitate its securement to a shopping cart or related device.

With the roller assembly 10 in a use situation of the aforesaid type, namely when mounted on a shopping cart utilizing a yoke arrangement similar to that illustrated by FIG. 7, the support axle 40 and the surrounding inner support shaft 39 are normally supported so as to be nonrotatable, whereby the remainder of the wheel assembly 10 thus freely rotates therearound. In such usage, the rollers 32 are disposed in direct rolling engagement with the inner support shaft 39 which hence defines the inner bearing race, and are also disposed in direct rolling engagement with the inner peripheral surface of the inner hub 16. The rollers 32 thus rotate about the inner support shaft 39, and also cause a corresponding rotation of the retainers 51. Since the rollers 32 themselves are rotatably supported on the axles 33, which axles 33 in turn are rotatably supported on the retainers 51, and which retainers 51 themselves are freely rotatable relative to both the inner support shaft 39 and the rim 11, the wheel thus possesses a large number of degrees of relative rotational freedom between the various components, whereby relative rotation within the wheel assembly will thus occur at locations possessing minimum friction, which locations may vary from time to time depending upon the environmental conditions under which the wheel assembly is utilized.

A significant advantage of the wheel assembly 10 as illustrated by FIGS. 1-6 is the ability to fully assemble this wheel assembly prior to its being mounted on the central support axle 72. Since the end caps 44 and 47 function to hold the retainers, and hence the bearing rollers, within the central opening of the rim, and since the bearing rollers in turn centrally and axially support the inner support shaft 39, the complete wheel assembly remains fully assembled and can be shipped in this fully assembled condition without requiring the presence of the central shaft 73 or the insert 40.

Referring now to FIG. 7, there is illustrated a variation of the improved wheel assembly 10' according to the present invention. In this variation, the rim 11' is identical to the rim 11 except for the provision thereon of a modified outer annular hub 21', and the mounting thereon of a modified tire 28'. In this variation, the outer annular hub 21' is of a substantially cylindrical construction and is provided with a rib 61 which projects radially outwardly thereof and extends circumferentially around the complete periphery thereof, which rib 61 is substantially centrally located. A further plurality of small ribs 62 extend axially from the center rib 61 and project toward the adjacent axial edges of the outer hub 21'. These ribs 62 are circumferentially spaced apart at substantially uniform intervals about the periphery of the rib. The tire 28', in this variation, comprises an annular solid tread which is fixed to and extends circumferentially around the rim, the tread being suitably molded around the rim and hence fixedly interlocked to the ribs 61 and 62 to thus provide a bond and mechanical lock between the tread and rim to prevent the tread from slipping either axially or circumferentially with respect to the rim. In most use applications, it is anticipated that the tread 28' will be molded of a plastics material, such as polyurethane.

The remainder of the wheel assembly 10' illustrated in FIG. 7 is otherwise identical to the wheel 10 illustrated by FIGS. 1-6. For convenience of illustration, the dust shields 61 have been eliminated from the wheel 10' of FIG. 7, but it will be understood that they can be provided if desired.

The wheel assemblies of this invention, namely the wheel assemblies 10 and 10' as described above, have exhibited extremely desirable operational properties in that the present invention thus provides a freely rotatable wheel which utilizes the planetary principle, and which permits substantially free and effortless rolling of the wheel relative to a substantially non-rotatable support axle. The free rolling of the wheel, which occurs due to the minimal friction which exists between the wheel rim and the support axle, thus permits rotation of the wheel while requiring less energy to effect such rotation. In addition, the arrangement of this invention, and the substantially unlimited degrees of rotational freedom, also allow the outer rim to traverse around the support axle through a greater distance than is achieved with wheels of standard construction. At the same time, this improved wheel can be very efficiently sealed so as to prevent contamination and wear of same, particularly the bearing components thereof, such as when the wheels are used in contaminating environments such as water, snow or ice. Further, the wheel assembly can be fully assembled, and then efficiently and safely handled and shipped in this fully assembled condition prior to mounting of the wheel assembly on an appropriate support axle. The arrangement of the bearing and the cooperation between the rollers and the retainers also facilitate efficient assembly of the bearing within the wheel assembly so as to permit efficient and economical manufacture of the wheel.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A freely rotatable wheel assembly, comprising:

a one-piece freely-rotatable annular rim having an axially-elongated inner annular hub defining therein an elongated central opening in coaxial alignment with the rotational axis of said rim, said rim being constructed of a hard low-friction material, and said inner annular hub having an inner annular surface thereon which surrounds said opening for defining an outer bearing race;

bearing means positioned within said central opening for creating a low-friction rolling engagement between said rim and a shaft which is coaxially and centrally positionable within said opening;

said bearing means including an inner bearing race member formed as an axially-elongated sleeve which is concentrically disposed within said central opening and spaced radially inwardly from said outer bearing race for defining an annular region therebetween;

said bearing means also including a plurality of cylindrical rollers which are constructed of hard low-friction nonmetallic material, said rollers being positioned within said annular region and being angularly spaced apart around said rotational axis so that the axes of said rollers define a circular locus which is generated about said rotational axis, said rollers being individually disposed in direct rolling engagement with said outer bearing race and with an inner annular bearing race as defined on the exterior periphery of said inner bearing race member;

a pair of end caps fixedly mounted on said rim adjacent the opposite axial ends of said central opening for closing the opposite axial ends of said annular region, at least one of said end caps being fixedly connected to but removable from said rim, said pair of end caps defining therein coaxially aligned central openings which are coaxially aligned with said rotational axis, and said inner bearing race member having opposite end portions thereof which are snugly but rotatably positioned within the central openings defined by said end caps;

each said roller being constructed of one piece and having an encircling annular groove formed therein which separates said roller into two cylindrical roller portions which are both disposed in rolling engagement with the inner and outer bearing races, and said inner bearing race member having an annular rib fixedly and integrally associated therewith and projecting radially outwardly therefrom, said rib being snugly but rotatably accommodated within the annular groove formed on each said roller, said annular rib having opposite side surfaces which are positioned for slidable engagement with annular side surfaces formed on said roller at opposite sides of said groove.

2. A wheel assembly according to claim 1, wherein said bearing means includes a pair of coaxially aligned but axially spaced annular retainers disposed substantially concentrically within said central opening adjacent the opposite axial ends of said annular region so that said plurality of cylindrical rollers are disposed axially between said retainers, said retainers being disposed in surrounding relationship to said inner bearing race member and being freely rotatable relative to both said rim and said inner bearing race member, and said bearing means also including an elongate axle associated with each said roller for supporting same on and between said retainers, each said axle extending parallel to said rotational axis and having the opposite ends thereof freely rotatably supported on said retainers, each said axle also having a respective said roller freely rotatably supported thereon.

3. A wheel assembly according to claim 2, wherein each said retainer is disposed directly adjacent the inner side surface of one of said end caps, each said retainer having a concentric annular flange which is integral therewith and projects axially outwardly from the outer side thereof toward the adjacent end cap, said annular flange being of narrow radial width and terminating in a narrow annular end surface which is disposed opposite a flat bearing surface formed on the inner sidewall of the adjacent end cap for permitting relative rotatable sliding engagement therebetween.

4. A wheel assembly according to claim 2 or claim 3, wherein said retainer comprises a flat platelike washer having a plurality of radial slots formed therein in angularly spaced relationship, each said radial slot rotatably accommodating therein an end of one of said axles.

5. A wheel assembly according to claim 2 or claim 3, wherein each retainer has a plurality of angularly-spaced openings formed therein for rotatably accommodating an end of one of said axles, and the axially inner side of said retainer having cam means associated therewith in the arcuate regions between said openings for engaging the ends of the axles and camming same circumferentially into said openings.

6. A wheel assembly according to claim 5, wherein said cam means includes a plurality of ramplike cams which project axially inwardly from the inner side surface of the retainer and are disposed within a circular array which defines a circular locus substantially equal to that defined by the axles, each said ramplike cam extending circumferentially between two adjacent openings and being of a substantially triangular configuration so as to define two cam surfaces which slope in opposite directions toward the two adjacent openings.

7. A wheel assembly according to claim 1, wherein said one-piece rim includes an integral outer annular hub which is concentric with and spaced radially outwardly from said inner annular hub, said inner and outer annular hubs being joined by radially-extending integral spoke means therebetween, and said outer annular hub when viewed in axial cross section being of a shallow channel-shaped cross section which opens radially outwardly so as to define a shallow retaining groove, and a semipneumatic tire mounted on and externally surrounding said annular rim, said tire having an inner annular portion which is snugly seated and axially confined within the retaining groove defined by said outer hub.

8. A wheel assembly according to claim 1, wherein said one-piece rim has the other of said end caps integrally and fixedly attached to said inner annular hub adjacent one axial end thereof and projecting radially inwardly therefrom, said inner annular hub having an annular groove formed therein adjacent the other axial end thereof, and said one end cap being elastically snappable into said groove for fixedly attaching said one end cap to said rim.

9. A wheel assembly according to claim 1 or claim 2, wherein said rim, said rollers, said retainers and said end caps are all constructed of a hard low-friction plastic material.

10. A wheel assembly according to claim 1 or claim 2, including an annular dust shield fixed to each end of the inner bearing race and disposed closely adjacent the exterior side of the respective end cap, said dust shield projecting radially outwardly and having an outer portion thereof positioned closely adjacent the axial end of the inner annular hub, and a labyrinth of annular axial flanges coacting between the end cap and the respective dust shield, one of the end cap and dust shield having at least one annular axially projecting flange thereon, the other of the end cap and dust shield having a pair of concentric annular flanges projecting axially therefrom and defining therebetween an annular clearance space into which projects said one annular flange.

* * * * *